United States Patent [19]
Benecke et al.

[11] Patent Number: 5,726,509
[45] Date of Patent: Mar. 10, 1998

[54] DIELECTRIC MOTOR

[75] Inventors: Wolfgang Benecke; Bernhard Wagner; Günter Fuhr; Rolf Hagedorn; Roland Glaser; Jan Gimsa, all of Berlin, Germany

[73] Assignee: Fraunhofer Gesellschaft zur Foerderung der angewandten Forschung e.V., Munich, Germany

[21] Appl. No.: 730,907

[22] PCT Filed: Feb. 2, 1990

[86] PCT No.: PCT/DE90/00067

§ 371 Date: Oct. 21, 1991

§ 102(e) Date: Oct. 21, 1991

[87] PCT Pub. No.: WO90/09057

PCT Pub. Date: Aug. 9, 1990

[30] Foreign Application Priority Data

Mar. 14, 1990 [DE] Germany ............... 325 466-5

[51] Int. Cl.$^6$ ................... H02N 1/00
[52] U.S. Cl. ............ 310/40 MM; 310/309; 318/116
[58] Field of Search ............ 310/40 MM, 308, 310/309; 318/135, 116

[56] References Cited

U.S. PATENT DOCUMENTS

| | | | |
|---|---|---|---|
| 3,024,371 | 3/1962 | Lefkowitz | 310/909 UX |
| 3,729,925 | 5/1973 | Emerson | 318/116 |
| 3,924,146 | 12/1975 | George | 310/12 |
| 3,951,000 | 4/1976 | Ferris | 318/116 |
| 4,477,859 | 10/1984 | Azuchi | 310/308 UX |
| 4,740,410 | 4/1988 | Muller et al. | 428/133 |
| 4,814,657 | 3/1989 | Yano | 310/309 |

FOREIGN PATENT DOCUMENTS

| | | |
|---|---|---|
| 0223947 | 9/1987 | European Pat. Off. |
| 0136979 | 6/1988 | Japan |
| 0136982 | 6/1988 | Japan |

OTHER PUBLICATIONS

Hertz/Hertz, Wied. Anm 13 (18/81) 266/275.
Quincke, Wied. Anm. 59 (1896) 41177.
Characteristic Rotor Speed Variations of a Dielectric Motor with a Low–Conductivity Liquid; J. Plays D: Appl. Phys. 1971, vol. 4, pp. 1893–1896.
Operation of a Dielectric Motor with a Low Conductivity Liquid; T. Coddington, A.F. Pollard and H. House; J. Phys. D: Appl. Phys. 1970, vol. 3, pp. 1212–1218.
A. Miniature Multipole Liquid–Immersed Dielectric Motor; P. E. Secker and M. R. Belmont; J. Phys. D: Appl. Phys. 1970, vol. 3, pp. 216–220.
A Simple Liquid–Immersed Dielectric Motor; P. E. Secker and I. N. Scialom; Journal of Applied Physics, vol. 39, No. 6; May 1964.
Maschinen; Die Kunstwerke der Mikromechanik; Jan. 1990.

*Primary Examiner*—Steven L. Stephan
*Attorney, Agent, or Firm*—Evenson, McKeown, Edwards & Lenahan, P.L.L.C.

[57] ABSTRACT

A motor whose torque is not generated by magnetic fields but rather by dielectric forces to be used in microelectronics and micromechanics. The rotors are composed of several dielectrics, which are arranged in a sector-shaped or shell-shaped manner or partially or completely envelop each other. These motors can be miniaturized down to a size of a few millimeters. They are distinguished by having slow to medium rotation speeds, short starting phases (ms range and less), extremely low current consumption, simple construction, high running constancy and being practically maintenance free. The characteristic curve of rotation (rotation as the function of the field frequency) may be selected in many ranges by changing the dielectrics of the rotor.

17 Claims, 3 Drawing Sheets

DIELECTRIC MOTOR

FIELD OF THE INVENTION

The fields of the present invention are, e.g. microelectronics, in which miniaturized dielectric motors can find application as micromechanical drive, control, switch and sensor systems. They may, however, also be utilized as miniature motors in micro-surgery, chemistry and gene technology.

BACKGROUND OF THE INVENTION

Dielectric motors have been known for quite some time, were however not employed in practice due to their grave drawbacks (very small torque, no fixed sense of rotation. A description of the theory of dielectric motors goes back to Heinrich Hertz, Hertz, Wied. Anm 13 (1881) 266/.

There are motors known whose rotors are composed of a dielectric and are supported between two or more electrodes. The electrodes are triggered with constant voltages. The rotation of the rotors ensues either following mechanical turning or via auxilliary electrodes, which, e.g. induce the solution enveloping the rotor to flow, thereby turning the rotor, QUINCKE, Wied. Anm. 59 (1896) 417; SECKER and SCIALOM, J. Appl. Physics 39 (1968) 277, SECKER and BELMONT, J.Phys.D: Appl. Phys. 3 (1970) 216. The rotor is usually enveloped by a gaseous or fluid medium or is in a vacuum; /QUINCKE, Wied. Anm. 59 (1896) 417.

The disadvantage of these motors is, apart from the rotation direction not being fixed and the required auxilliary start devices, the difficult regulation of the rotation speed, as it is very dependent on the square of the field strength. Recently, it has been recognized that the extreme miniaturizability of this type of motor is an advantage and micromechanical components in the form of chips have been developed (GEO 10 (1988) 188; U.S. Pat. No. 4,740,410) in which rotating electric fields produced via multi-electrode systems were utilized so that start devices can be obviated.

Rotating electric fields have been used to examine biological objects such as cells since 1982 (ARNOLD and ZIMMERMANN, Z.Naturforsch. 37c (1982) 908), are however, also employed in conventional motors of the magnetic induction principle.

An object of the present invention is to provide a cost-effective improved dielectric motor which allow additional possible applications as an integral component in microelectronics and in micromechanics.

Another object of the present invention is to provide a dielectric motor with an influenceable characteristic rotation curve, having constant and variable rotation conditions that can be easily and precisely controlled as well as universally and cost-efficiently utilized. The starting period should lie in the millisecond range and below.

In accordance with the present invention, this object is accomplished in that the rotor has in one or several directions continuous or discontinuous transitions between different dielectric materials. The rotor may be composed of symmetric or asymmetric sectors which are arranged radially to the axis of rotation. A rotor configuration in which the rotor comprises symmetric or asymmetric layers, which are arranged radially or axially to the axis of rotation, is also contemplated. Electric conductors or a vacuum may be disposed between the layers and the sectors. Furthermore, combinations of sectors and radial and axial layers may be used in the design of the construction of the dielectric rotor.

The present invention also permits a combination of homogeneous and inhomogeneous dielectrics, which are optically transparent and/or deformable. The rotors are driven via circular polarized or discontinuously rotating electric fields, by which the rotation direction is determined.

With increasing number of rotor dielectrics, the rotation spectrum (rotation as the function of the circular frequency of the external field) of the rotor becomes more complicated and is characterized by a multiplicity of well-differentiable states. These surprising rotation spectra are not known from any other type of motor.

In miniaturized form, the starting time of the motor is less than 1 ms, which proves its advantages for microelectronic applications. The principle described herein differs fundamentally from induction field motors. In many ranges the characteristic rotation curve of the motor can be selected freely via the selection and combination of the rotor dielectrics.

Other objects, advantages and novel features of the present invention will become apparent from the following detailed description of the invention when considered in conjunction with the accompanying drawings.

DETAILED DESCRIPTION OF THE DRAWINGS

Figure 1A:
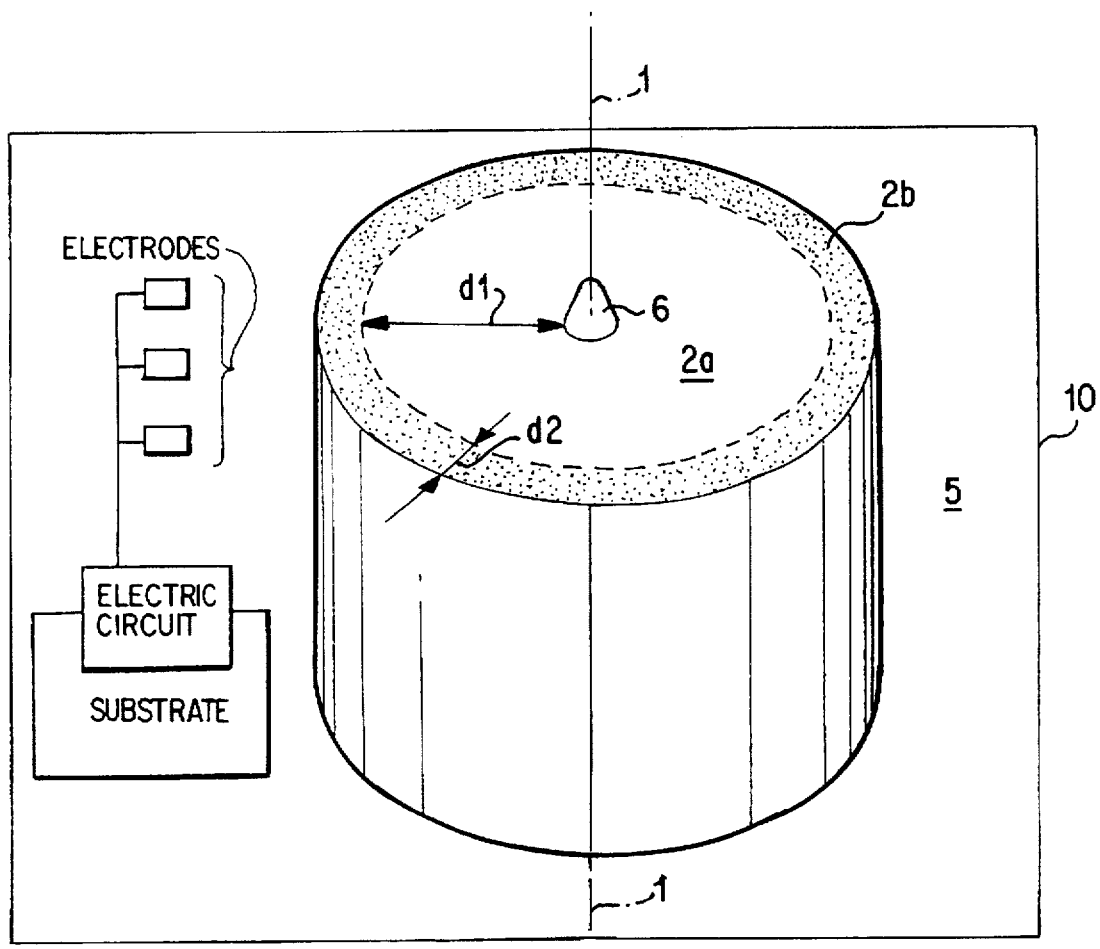
FIGS. 1a and 1b show a rotor having two dielectrics constructed in accordance with an embodiment of the present invention and characteristic rotation curve for the rotor.
Figure 1B:
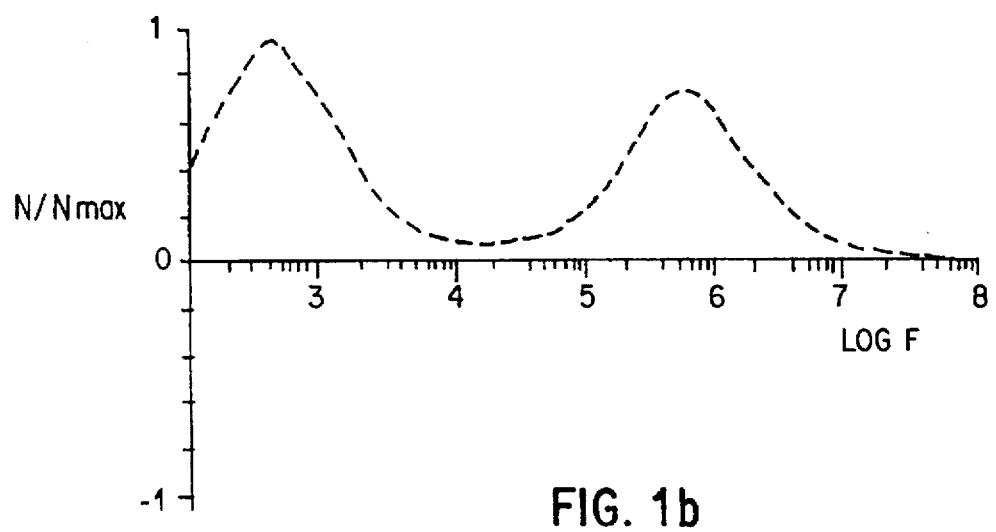

The rotor of FIG. 1a comprises two dielectrics 2a, 2b and is enveloped by an enveloping medium such as a low conductive fluid 5 (water, alcohol, etc.). The external electric field generated by at least three electrodes acts via the enveloping medium 5. The electrodes, an electric circuit that triggers and controls the dielectric motor, and a substrate in which the electric circuit is integrated, are illustrated schematically in FIG. 1a. The substrate can be made of a semi-conducting monocrystal, for example. The rotor is supported in a known manner by support 6, 1 designating the axis of rotation. The circular frequency (f) of the field and the field strength (usually 5 to 100 kV/m) determines the rotation speed of the rotor. The characteristic curve of the rotor (rotation as a function of the circular frequency of the external field) may be fixed and altered by the selection and combination of the dielectrics of the rotor and the enveloping solution 5. A possible characteristic rotation curve is given in FIG. 1b. Each dielectric can be chacterized by the relaxation period of the respective polarization charges. This period is dependent on the electric properties of the respective adjacent dielectrics intersected by the field lines. In order to describe the parameters of the curve, the thickness of the dielectrics and their relaxation period are given in the following.

Contemplated Parameters for the embodiment of FIG. 1a:

| d1 in m | d2 in m | Relaxation period in s$^{-1}$ | |
| --- | --- | --- | --- |
|  |  | t1 | t2 |
| 4.8*10$^{-6}$ | 2*10$^{-7}$ | 1.6*10$^{-6}$ | 2.3*10$^{-3}$ |

Figure 2A:
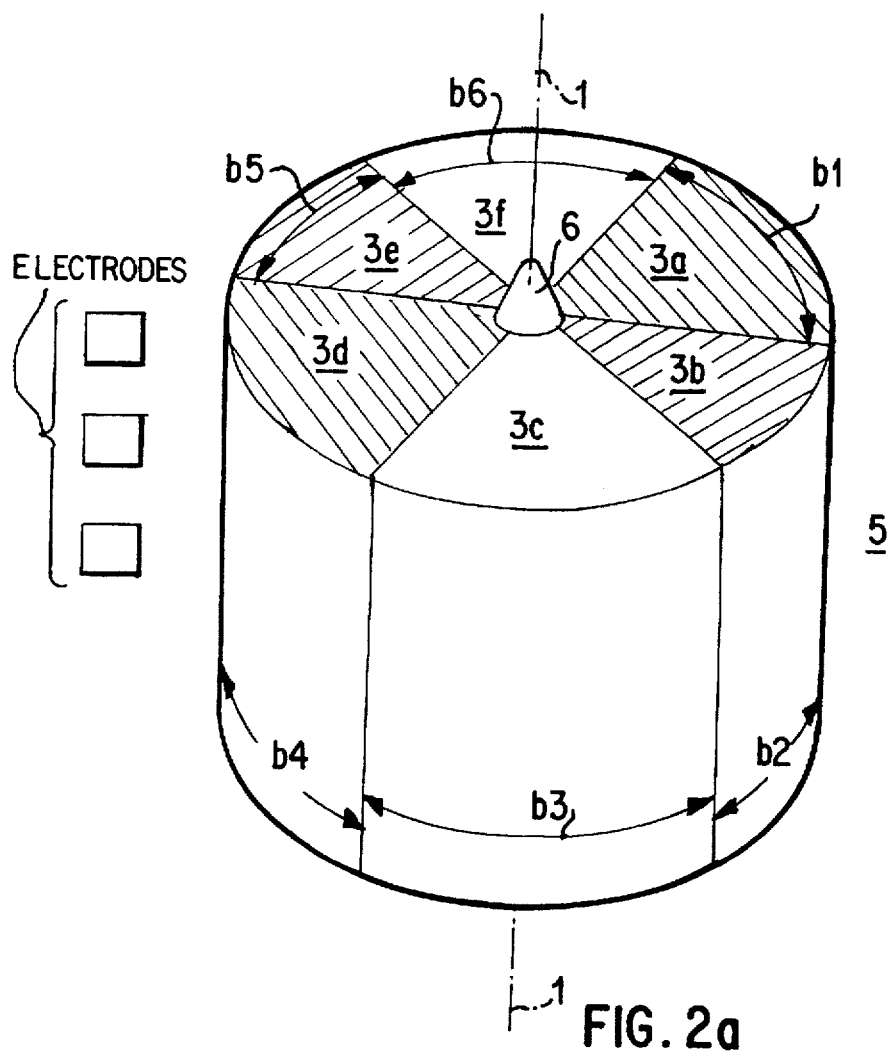
FIGS. 2a and 2b show a rotor having dielectric sectors constructed in accordance with another embodiment of the present invention and a characteristic rotation curve for the rotor.
Figure 2B:
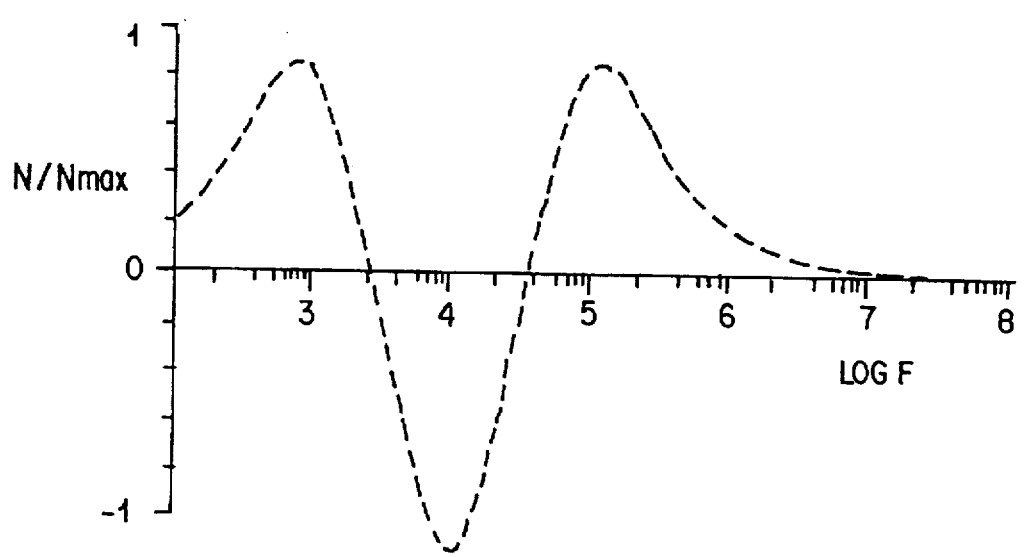

The rotor of FIG. 2a has six sectors 3a, 3b, 3c, 3d, 3e and 3f and is enveloped by a low-conductive fluid 5 (water, alcohol, etc.). The electric properties of the rotor and its surroundings determine the characteristic rotation curve. The turn of the rotor can be induced from the outside via a rotating electric field without loops. The torque can be influenced via the field strength or the circular frequency of the field. The characteristic rotation curves can be fixed and altered via the combination of the sector dielectrics. A possible characteristic curve is given in FIG. 2a.

The widths of the sectors b1–b6 (FIG. 2a) are distributed in the example in fractions of the circumference (U) of the rotor as follows:

b1=b4=0.15
b2=b5=0.15
b3=b6=0.2

The relaxation periods of the dielectrics for FIG. 2a are approx:

t1=t4=10$^{-3}$ s$^{-1}$
t2=t5=10$^{-5}$ s$^{-1}$
t3=t6=10$^{-4}$ s$^{-1}$

Figure 3A:
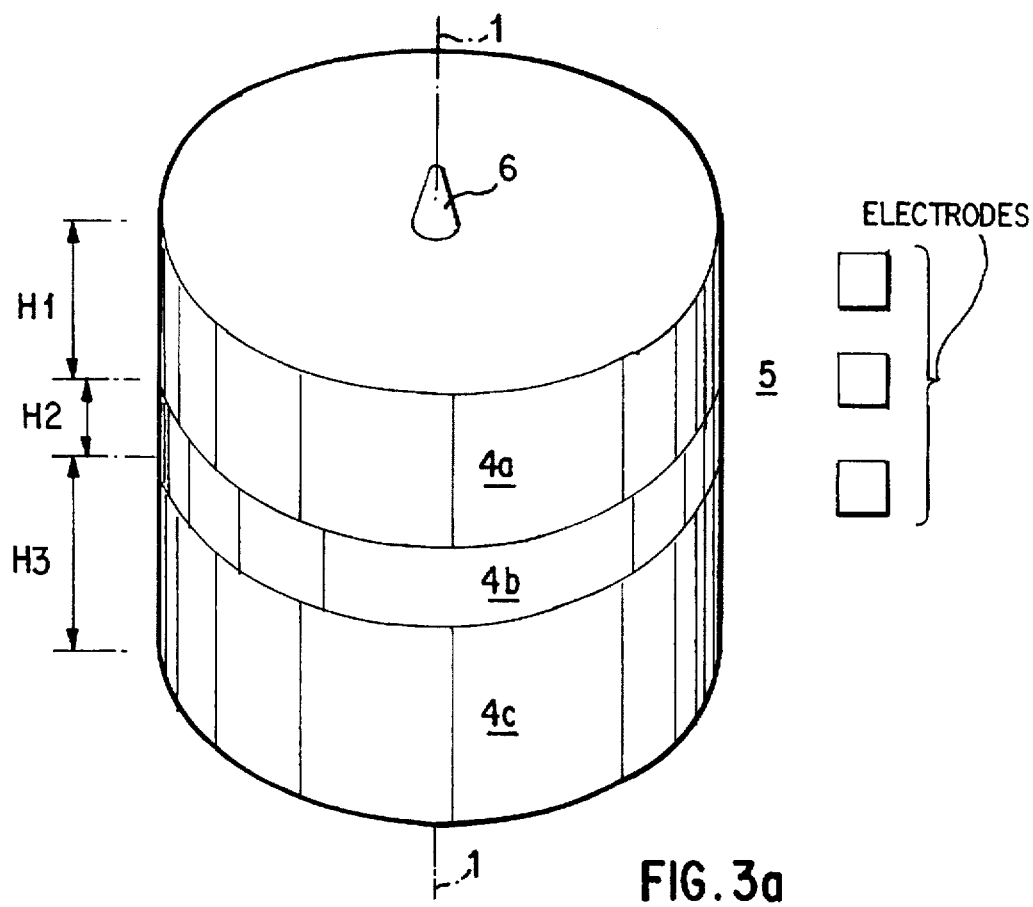
FIGS. 3a and 3b show a rotor having axially arranged dielectric disks constructed in accordance with another embodiment of the present invention and a characteristic rotation curve for the rotor.
Figure 3B:
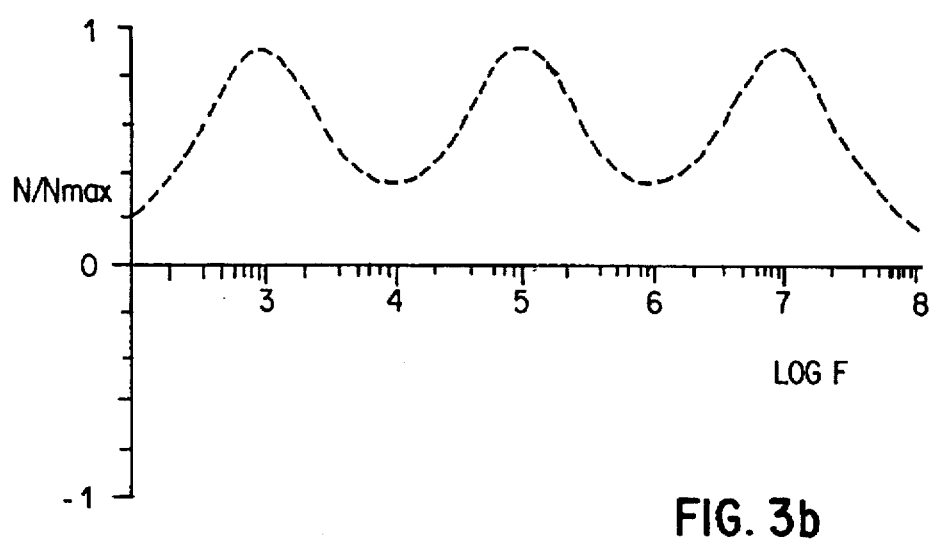

The rotor shown in FIG. 3a has three axially arranged dielectric layers 4a, 4b and 4c. A possible characteristic curve is given in FIG. 3A. It is based on the following set of parameters:

H1=H2=H3
t1=10$^{-3}$s$^{-1}$
t2=10$^{-3}$s$^{-1}$
t3=10$^{-7}$s$^{-1}$

The dielectric elements of the motor are made using manufacturing methods common in semiconductor technology and micromechanics.

By way of example silicon, possibly provided with thin insulation layers such as SiP$_2$ or Si$_3$N$_4$, or glass is used as a substrate.

The electrodes are structured using photolithographic methods and galvanically molded, e.g. with gold. In this way the pattern of the electrodes can be defined with micrometer precision. By using deep-etch lithography electrode heights of several hundred micrometers can be obtained.

The rotor is made of dielectric materials also using micro-mechanical processes. Layers such as SiO$_2$, Si$_3$N$_4$ or TiO$_2$ can be made and structured up to thicknesses in the micro-meter range. Thicker rotors can be made of photographic lacquer using deep lithography.

Precise grooves and channels, which serve to fix the rotor or to conduct to or away the solution or medium enveloping the motor, are etched into the substrate with isotropic or anisotropic and selective etching processes. With the same processes, a rotor axis can also be made which is connected to the substrate.

An encapsulation of the system can be obtained with a second wafer which is bonded onto the substrate wafer.

The use of silicon as a substrate material offers the special possibility of integrating electric circuits for triggering and controlling the motor together with the mechanical elements on one common substrate (wafer).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A dielectric motor in an enveloping medium, comprising:

electrodes; and a rotor having a plurality of dielectrics and in at least one direction continuous transitions between the dielectrics with one of electrically conductive zones and a vacuum between said dielectrics;

wherein the rotor is driven by one of circular polarized and discontinuously rotating electrical fields, and has a rotation spectrum with a plurality of differentiable states.

2. The dielectric motor of claim 1, wherein the dielectrics are arranged radially to an axis of rotation in one of symmetric and asymmetric layers.

3. The dielectric motor of claim 1, wherein the dielectrics are arranged radially to an axis of rotation in one of symmetric and asymmetric dielectric sectors.

4. The dielectric motor of claim 1, wherein the dielectrics are arranged axially to an axis of rotation in one of symmetric and asymmetric layers.

5. A dielectric motor according to claim 4, wherein said dielectric layers are arranged along said axis of rotation.

6. A dielectric motor according to claim 3, wherein said dielectric sectors are arranged around said axis of rotation.

7. A dielectric motor according to claim 2, wherein said dielectric layers are arranged around said axis of rotation.

8. A dielectric motor according to claim 1, wherein said dielectrics at least partially cover one another.

9. A dielectric motor according to claim 1, wherein said dielectrics are homogeneous.

10. A dielectric motor according to claim 1, wherein said dielectrics are inhomogeneous.

11. A dielectric motor according to claim 1, wherein at least one of said dielectrics is penetrable for electromagnetic waves.

12. A dielectric motor according to claim 1, wherein at least one of said dielectrics is deformable.

13. A dielectric motor according to claim 1, wherein at least one of SiO$_2$, Si$_3$N$_4$, TiO$_2$ or glass is used as said dielectrics and said electrodes are photolithographically galvanically molded electrodes.

14. A dielectric motor according to claim 1, further comprising an electric circuit for triggering and controlling said dielectric motor, said electric circuit and said monitor being integrated into a substrate.

15. A dielectric motor according to claim 14, wherein said substrate is made of a semiconducting monocrystal.

16. A dielectric motor according to claim 1, wherein said dielectrics at least partially cover the electrically conductive zones.

17. A dielectric motor in an enveloping medium, comprising:

electrodes; and a rotor having a plurality of dielectrics and in at least one direction continuous transitions between the dielectrics with one of electrically conductive zones and a vacuum between said dielectrics;

wherein the rotor is driven via rotating electrical fields such that a characteristic curve of the rotor has a multiplicity of well-defined states, said states being alterable via selections of the plurality of dielectrics of the rotor.

* * * * *